United States Patent
Cai et al.

(10) Patent No.: US 12,471,092 B2
(45) Date of Patent: *Nov. 11, 2025

(54) DYNAMIC WIRELESS NETWORK ARCHITECTURE TO SERVE UPLINK-CENTRIC AND DOWNLINK-CENTRIC USER APPLICATIONS

(71) Applicant: T-MOBILE INNOVATIONS LLC, Overland Park, KS (US)

(72) Inventors: Zheng Cai, Fairfax, VA (US); Zheng Fang, McLean, VA (US); Saied Kazeminejad, Ashburn, VA (US); Yu Wang, Fairfax, VA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/542,979

(22) Filed: Dec. 18, 2023

(65) Prior Publication Data

US 2024/0121781 A1 Apr. 11, 2024

Related U.S. Application Data

(63) Continuation of application No. 17/498,576, filed on Oct. 11, 2021, now Pat. No. 11,877,285, which is a
(Continued)

(51) Int. Cl.
*H04W 72/20* (2023.01)
*H04L 1/1812* (2023.01)
(Continued)

(52) U.S. Cl.
CPC ............ *H04W 72/20* (2023.01); *H04L 1/1812* (2013.01); *H04L 5/0053* (2013.01); *H04W 28/06* (2013.01);
(Continued)

(58) Field of Classification Search
None
See application file for complete search history.

(56) References Cited

U.S. PATENT DOCUMENTS 9,775,045 B2 9/2017 Li et al.
9,844,089 B2 12/2017 Wu
(Continued)

OTHER PUBLICATIONS

Katerina Smiljkovikj, et al.; "Capacity Analysis of Decoupled Downlink and Uplink Access in 5G Heterogeneous Systems;" Oct. 27, 2014; pp. 1-26.
(Continued)

*Primary Examiner* — Gregory B Sefcheck

(57) ABSTRACT

A wireless data system receives first user data for a first user application. The wireless data system receives second user data for a second user application. The wireless data system processes the first user data with a first set of functions based on the first user application. The wireless data system processes the second user data with a second set of the functions based on the second user application. The functions comprise Physical Layer (PHY), Media Access Control (MAC), Radio Link Control (RLC), Packet Data Convergence Protocol (PDCP), and Radio Resource Control (RRC). The first set of the functions differs from the second set of the functions.

20 Claims, 7 Drawing Sheets

Related U.S. Application Data continuation of application No. 15/922,461, filed on Mar. 15, 2018, now Pat. No. 11,191,060.

(51) Int. Cl.

| | | |
|---|---|---|
| *H04L 5/00* | (2006.01) | |
| *H04L 69/321* | (2022.01) | |
| *H04W 28/06* | (2009.01) | |
| *H04W 80/02* | (2009.01) | |
| *H04W 88/08* | (2009.01) | |

(52) U.S. Cl.
CPC ......... *H04W 80/02* (2013.01); *H04W 88/085* (2013.01); *H04L 69/321* (2013.01)

(56) References Cited

U.S. PATENT DOCUMENTS

| | | | |
|---|---|---|---|
| 10,594,451 B2 | 3/2020 | Wang et al. | |
| 10,659,079 B2 | 5/2020 | Hsu et al. | |
| 2007/0073805 A1 | 3/2007 | Jorgensen | |
| 2012/0195237 A1* | 8/2012 | Chan | H04B 1/44 370/278 |
| 2015/0003263 A1 | 1/2015 | Senarath et al. | |
| 2017/0164366 A1 | 6/2017 | Zeng et al. | |
| 2017/0164391 A1 | 6/2017 | Zeng et al. | |
| 2017/0170943 A1 | 6/2017 | Zeng et al. | |
| 2017/0171856 A1 | 6/2017 | Zeng et al. | |
| 2017/0245316 A1 | 8/2017 | Salkintzis | |
| 2017/0331577 A1 | 11/2017 | Parkvall et al. | |
| 2017/0331670 A1 | 11/2017 | Parkvall et al. | |
| 2018/0110019 A1 | 4/2018 | Ly et al. | |
| 2018/0110082 A1 | 4/2018 | Saily et al. | |
| 2018/0132270 A1* | 5/2018 | Zeng | H04L 1/1887 |
| 2018/0184424 A1 | 6/2018 | Wang et al. | |
| 2018/0191479 A1 | 7/2018 | Baek et al. | |
| 2018/0205808 A1* | 7/2018 | Yang | H04L 45/00 |
| 2018/0227942 A1 | 8/2018 | Hwang et al. | |
| 2018/0242319 A1 | 8/2018 | Akkarakaran et al. | |
| 2018/0262316 A1* | 9/2018 | Wang | H04L 5/0055 |
| 2018/0269950 A1 | 9/2018 | Wilson et al. | |
| 2018/0270814 A1 | 9/2018 | Wilson et al. | |
| 2018/0323801 A1 | 11/2018 | Hsu et al. | |
| 2019/0082422 A1 | 3/2019 | Sun et al. | |
| 2019/0132870 A1 | 5/2019 | Guey et al. | |
| 2019/0141589 A1* | 5/2019 | Wei | H04W 36/0088 |
| 2019/0174483 A1 | 6/2019 | Tsai et al. | |
| 2019/0253207 A1 | 8/2019 | Li | |
| 2020/0128520 A1 | 4/2020 | Chen et al. | |
| 2020/0236732 A1 | 7/2020 | Liu et al. | |
| 2020/0244393 A1* | 7/2020 | Zhang | H04L 5/0007 |
| 2021/0144039 A1 | 5/2021 | Park et al. | |

OTHER PUBLICATIONS

Erik Westerberg; "4G/5G RAN architecture, How a Split Can Make the Difference;" Ericsson Technology Review, Charting the Future of Innovation; Jul. 22, 2016; pp. 1-16; vol. 93, #Jun. 2016; Ericsson; Stockholm, Sweden.

Nokia, et al., "Clean up for functional split", 3GPP TSG-RAN WG3 Meeting #95, Agenda Item 10.7.1, Feb. 13-17, 2017, pp. 1-6, Athens, Greece.

Huawei, "Scope of RAN internal function split", 3GPP TSG-RAN3 Meeting #93, Agenda Item 10.5.4, Aug. 22-26. 2016, pp. 1-2, Gothenburg, Sweden.

Huawei, "TP for including PDAP layer", 3GPP TSG-RAN3 Meeting #95, Agenda Item 10.7.1, Feb. 13-17, 2017, pp. 1-8, Athens, Greece.

* cited by examiner

DYNAMIC WIRELESS NETWORK ARCHITECTURE TO SERVE UPLINK-CENTRIC AND DOWNLINK-CENTRIC USER APPLICATIONS

RELATED CASES

This United States Patent Application is a continuation of U.S. Pat. No. 11,877,285 B2 that was filed on Oct. 11, 2021 and is entitled "DYNAMIC WIRELESS NETWORK ARCHITECTURE TO SERVE UPLINK-CENTRIC AND DOWNLINK-CENTRIC USER APPLICATIONS." U.S. Pat. No. 11,877,285 B2 is hereby incorporated by reference into this United States Patent Application. U.S. Pat. No. 11,877,285 B2 is a continuation of U.S. Pat. No. 11,191,060 B2 that was filed on Mar. 15, 2018 and is entitled "DYNAMIC WIRELESS NETWORK ARCHITECTURE TO SERVE UPLINK-CENTRIC AND DOWNLINK-CENTRIC USER APPLICATIONS." U.S. Pat. No. 11,191,060 B2 is hereby incorporated by reference into this United States Patent Application.

TECHNICAL BACKGROUND

Wireless data networks serve wireless User Equipment (UEs) with mobile data communication services like internet access, voice calling, and video calling. The wireless UEs could be computers, phones, headsets, graphic displays, vehicles, drones, or some other wireless communication apparatus. The wireless data networks have wireless access points that exchange user data and signaling over the air with these wireless UEs. The wireless access points include Distributed Unit (DU) circuitry. The DU circuitry uses network protocols like Fifth Generation New Radio (5G NR), Long Term Evolution (LTE), and Institute of Electrical and Electronic Engineers 802.11 (WIFI). The DU circuitry executes network software applications to process the user data responsive to the signaling. The network software applications comprise: Physical Layer (PHY), Media Access Control (MAC), Radio Link Control (RLC), Packet Data Convergence Protocol (PDCP), and Radio Resource Control (RRC). These network software applications drive the DU circuitry to exchange wireless user data and signaling with the wireless UEs.

The network software applications also drive the DU circuitry to exchange user data and signaling with Central Unit (CU) circuitry. The CU circuitry is embedded in the backhaul data path somewhere between the DU circuitry in the wireless access points and the wireless network core. The CU circuitry may execute network software applications that drive the CU circuitry to exchange user data and signaling with the DU circuitry in the wireless access points and with the wireless network core.

With the introduction of network slicing technology, some of the network software applications are moved from the DU circuitry in the wireless access points to the CU circuitry in the backhaul transport network. For example, the RRC and PDCP software applications have been moved from the DU circuitry in the wireless access points to the CU circuitry in the backhaul transport network. In another example, the MAC, RLC, RRC, and PDCP software applications were moved from the DU circuitry in the wireless access points to the CU circuitry in the backhaul transport network.

In addition to protocol slicing, Uplink/Downlink (UL/DL) de-coupling technology is used to separate the DU circuitry on the UL and/or the DL. In addition, UL/DL de-coupling technology is used to separate the CU circuitry on the UL and/or the DL. Thus, a wireless UE may get its UL from DU circuitry in one wireless access point and get its DL from different DU circuitry in another wireless access point. Likewise, the UL for the wireless UE may traverse CU circuitry in one backhaul link, and the DL for the wireless UE may traverse different CU circuitry in another backhaul link.

The UEs execute user applications like video streaming, virtual reality, internet access, machine communications, and the like. These user applications may be UL-centric or DL-centric. A UL-centric user application transfers more data from the UEs to the wireless data network than it receives from the network into the UEs. A DL-centric user application receives more data from the wireless network into the UEs than it transfers from the UEs to the network. With the advent of 5G technologies like enhanced Mobile Broadband (eMBB), massive Machine Type Communications (mMTC), and Ultra-Reliable Low-Latency Communications (URLLC), the asymmetry on the DL and UL should only get worse. Unfortunately, new technologies like network slicing and UL/DL de-coupling have not been optimized for both UL-centric user applications and DL-centric user applications executing in the same wireless UE at the same time.

Technical Overview

In some examples, a Distributed Unit (DU) receives first user data for a first user application. The DU receives second user data for a second user application. The DU processes the first user data with a first set of functions based on the first user application. The DU processes the second user data with a second set of the functions based on the second user application. The functions comprise Physical Layer (PHY), Media Access Control (MAC), Radio Link Control (RLC), Packet Data Convergence Protocol (PDCP), and Radio Resource Control (RRC). The first set of the functions differs from the second set of the functions.

In some examples, a Centralized Unit (CU) receives first user data for a first user application. The CU receives second user data for a second user application. The CU processes the first user data with a first set of functions based on the first user application. The CU processes the second user data with a second set of the functions based on the second user application. The functions comprise PHY, MAC, RLC, PDCP, and RRC. The first set of the functions differs from the second set of the functions.

In some examples, a Distributed Unit (DU) and a Centralized Unit (CU) receive first user data for a first type of user applications. The DU and the CU receive second user data for a second type of the user applications. The DU and the CU process the first user data with a first distribution of functions across the DU and the CU based on the first type of the user applications. The DU and the CU process the second user data with a second distribution of the functions across the DU and the CU based on the second type of the user applications. The functions comprise PHY, MAC, RLC, PDCP, and RRC. The first distribution of the functions differs from the second distribution of the functions.

DETAILED DESCRIPTION

Figure 1:
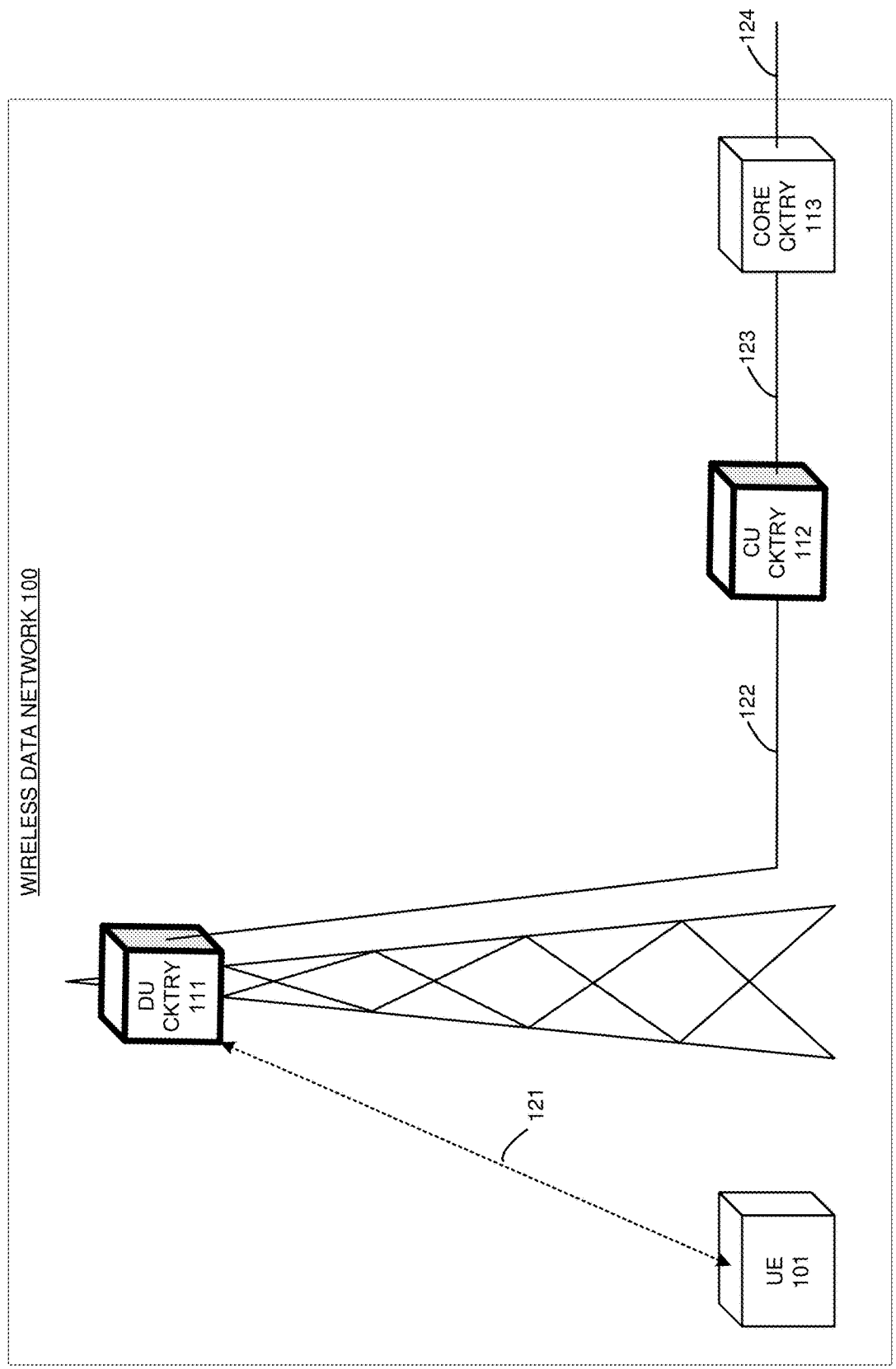
FIG. 1 illustrates a wireless data network to simultaneously process Uplink (UL) data and Downlink (DL) data for user applications based on whether the user applications are UL-centric or DL-centric.

FIG. 1 illustrates wireless data network 100 to simultaneously process Uplink (UL) data and Downlink (DL) data for user applications based on whether the user applications are UL-centric or DL-centric. Wireless data network 100 comprises wireless User Equipment (UE) 101, Distributed Unit (DU) circuitry (cktry) 111, Central Unit (CU) circuitry 112, core circuitry 113, and data communication links 121-124.

UE 101 could be a computer, phone, headset, graphic display, vehicle, drone, or some other wireless communication apparatus. UE 101 uses wireless network protocols like Fifth Generation New Radio (5G NR), Long Term Evolution (LTE), and Institute of Electrical and Electronic Engineers 802.11 (WIFI). UE 101 executes user applications like video streaming, virtual reality, machine communications, and internet access. These user applications may be UL-centric, DL-centric, or symmetrical.

A UL-centric user application transfers more data from UE 101 to the wireless data network 100 than from network 100 to UE 101. For example, a camera application that serves live video from UE 101 to network 100 is a UL-centric user application. A DL-centric user application receives more data from network 100 to UE 101 than is transmitted from UE 101 to network 100. For example, a movie application that streams movies from network 100 to UE 101 is a DL-centric user application. Most user applications are DL-centric. User applications that have symmetric UL/DL loads are typically classified as DL-centric.

UE 101 and DU circuitry 111 wirelessly exchange user data over wireless link 121. Although DU circuitry 111 is shown on a tower, tower-mounting is not required. DU circuitry 111 and CU circuitry 112 exchange the user data over data link 122. CU circuitry 112 and core circuitry 113 exchange the user data over data link 123. Core circuitry 113 and other systems (not shown) exchange the user data over data link 124. Data communication link 121 is wireless. Data communication links 122-124 may be wireless, wireline, or optical—including combinations thereof. Data communication links 122-124 may also include intermediate network elements and networks.

DU circuitry 111 comprises wireless transceiver circuitry and baseband circuitry. The wireless transceiver circuitry comprises antennas, modulators, amplifiers, filters, digital/analog interfaces, Digital Signal Processors (DSPs), memory circuitry, firmware/software, and bus circuitry. The transceiver circuitry uses wireless network protocols like 5G NR, LTE, and WIFI. The baseband circuitry comprises Central Processing Unit (CPU) circuitry, memory circuitry, software, bus circuitry, and backhaul circuitry. The software includes an operating system and modules for Physical Layer (PHY), Media Access Control (MAC), Radio Link Control (RLC), Packet Data Convergence Protocol (PDCP), and Radio Resource Control (RRC).

CU circuitry 112 comprises data communication and data processing circuitry. The data communication circuitry comprises DSPs, memory circuitry, firmware/software, and bus circuitry. The data processing circuitry comprises CPU circuitry, memory circuitry, software, bus circuitry, and backhaul circuitry. The software includes an operating system and modules for the PHY, MAC, RLC, PDCP, and RRC.

Core circuitry 112 comprises network elements like Mobility Management Entities (MMEs), Home Subscriber Systems (HSS), Serving Gateways (S-GWs), Packet Data Network Gateways (P-GWs), Policy Charging Rules Functions (PCRFs), Internet Protocol Multimedia Subsystem (IMS) servers, and the like.

DU circuitry 111 and CU circuitry 112 comprise computer hardware and software that form a special-purpose machine—a wireless data network that processes user data for user applications based on whether the applications are UL-centric or DL-centric. The computer hardware comprises processing circuitry like CPUs, DSPs, Graphical Processing Units (GPUs), transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like Control Units, Logic Units (LUs), and Random-Access Memory (RAM). In turn, the CUs, LUs, and RAM are metallically connected to form CPUs, DSPs, GPUs, transceivers, bus circuitry, and memory.

In the computer hardware, the Control Units drive data between the RAM and the LUs, and the LUs operate on the data. The Control Units also drive interactions with external memory like flash drives, disk drives, and the like. The computer hardware executes machine-level software to control and move data by driving machine-level inputs like voltages and currents to the Control Units, LUs, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into the special-purpose DU circuitry and CU circuitry that is described herein.

In operation, UE 101 executes DL-centric client applications and executes UL-centric server applications. The terms "client" and "server" are used in their most general sense to distinguish between data-generating applications (server applications) and data-consuming applications (client applications). The UL is described first.

For the UL, DU circuitry 111 wirelessly receives UL "client" data from the DL-centric client applications in UE 101. Responsive to the DL-centric client applications, DU circuitry 111 executes a PHY, MAC, RLC, PDCP, and RRC to process and transfer the UL client data to CU circuitry 112 over data link 122. Responsive to the DL-centric client applications, CU circuitry 112 routes the UL client data to core circuitry 113 over data link 123. Core circuitry 113 typically transfers the UL client data over data link 124 to some other systems.

Also for the UL, DU circuitry 111 wirelessly receives UL "server" data from the UL-centric server applications in UE 101. In response to the UL-centric server applications, DU circuitry 111 executes the PHY and a Hybrid Answer Repeat Request (HARQ) portion of the MAC to process and transfer the UL server data to the UL MAC in CU circuitry 112 over data link 122. Responsive to the UL-centric server applications, CU circuitry 112 executes the rest of the UL MAC and the RLC, PDCP, and RRC and transfers the UL server data to core circuitry 113. Core circuitry 113 typically transfers the UL server data over data link 124 to some other systems.

For the DL, core circuitry 113 typically receives DL client data over data link 124 from the other systems and transfers the DL client data for UE 101 to CU circuitry 112. CU circuitry 112 receives DL client data from core circuitry 113 for the DL-centric client applications in UE 101. Responsive to the DL-centric client applications, CU circuitry 112 executes the RRC, PDCP, RLC, and part of the MAC to process and transfer the DL client data to DU circuitry 111 over data link 122. The MAC in CU circuitry 112 does not perform HARQ. Responsive to the DL-centric client applications, DU circuitry 111 executes the HARQ portion of the MAC and the PHY to process and wirelessly transfer the DL client data to wireless UE 101 over wireless link 121.

Also for the DL, core circuitry 113 typically receives DL server data over data link 124 from the other systems and transfers the DL server data for UE 101 to CU circuitry 112. CU circuitry 112 receives DL server data from core circuitry 113 for the UL-centric server applications in UE 101. Responsive to the UL-centric sever applications, CU circuitry 112 routes the DL server data to DU circuitry 111. Responsive to the UL-centric sever applications, DU circuitry 111 executes the RRC, PDCP, RLC, MAC, and PHY to process and wirelessly transfer the DL server data to wireless UE 101.

The client data for the DL-centric client applications has some form of DL-centric indicator. The server data for the UL-centric server applications has some form of UL-centric indicator. These indicators could be application identifiers, DL/UL identifiers, internet address/port combinations, and/or some other data marker. DU circuitry 111 and CU circuitry 112 receive signaling that individually correlates the UL-centric user applications and the DL-centric user applications with their specific application identifiers, DL/UL identifiers, and/or internet address/port combinations. DU circuitry 111 and CU circuitry 112 translate these centricity indicators into the appropriate data processing paths as described herein. Using the centricity indicators in the user data, DU circuitry 111 and CU circuitry 112 simultaneously process both UL-centric server data and DL-centric client data using their own optimized network architectures.

Figure 2:
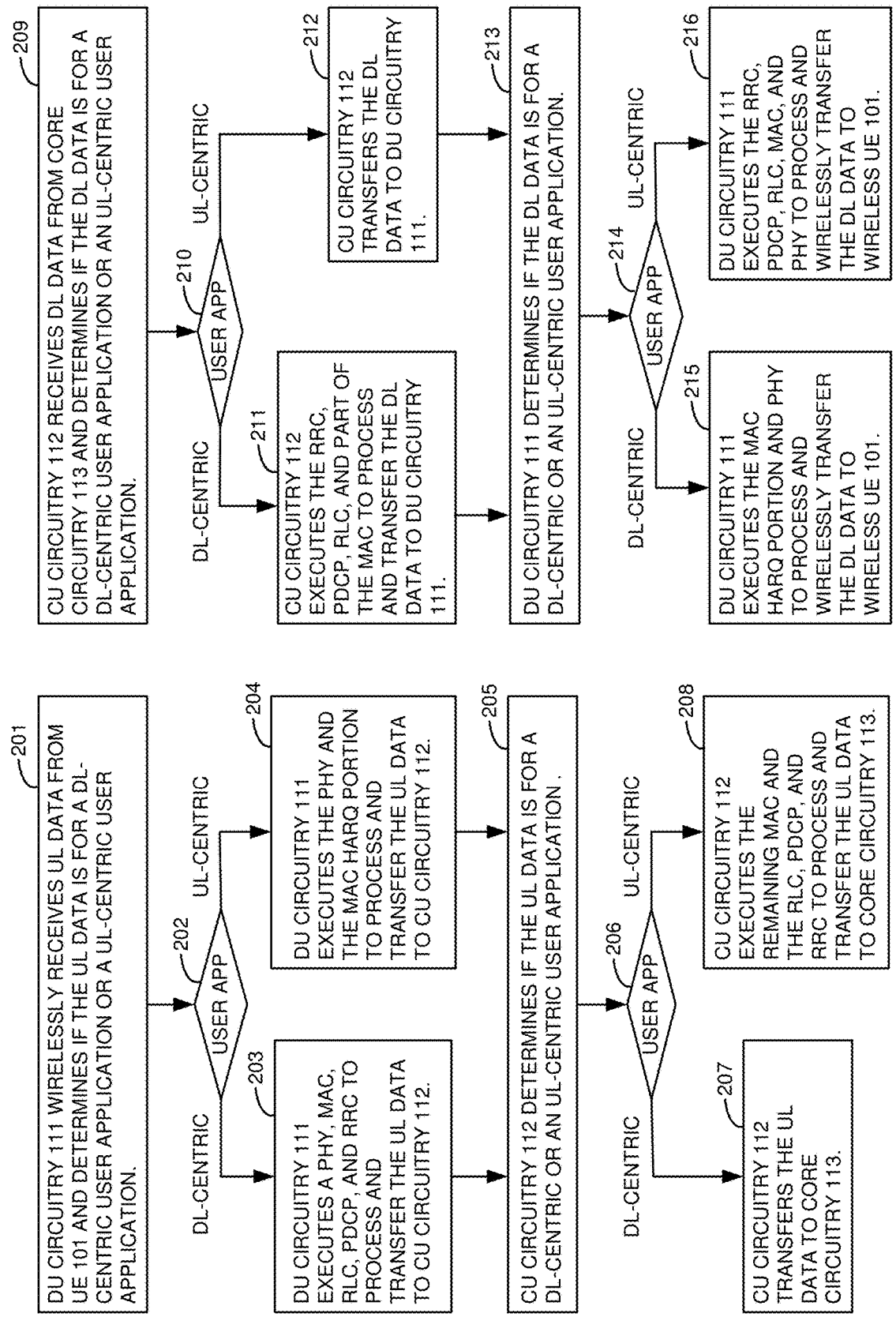
FIG. 2 illustrates the operation of the wireless data network to process UL data and DL data for a user application based on whether the user application is UL-centric or DL-centric.

FIG. 2 illustrates the operation of wireless data network 100 to process UL data and DL data for the user application based on whether the user application is UL-centric or DL-centric. Process blocks 201-208 describe UL operations and process blocks 209-216 describe DL operations. Process blocks 201-208 and process blocks 209-216 occur simultaneously. In process block 201, DU circuitry 111 wirelessly receives UL data and determines if the UL data is for a DL-centric user application or a UL-centric user application (201). If the UL data is for a DL-centric user application (202), then DU circuitry 111 executes a PHY, MAC, RLC, PDCP, and RRC to process and transfer the UL data to CU circuitry 112 (203). If the UL data is for a UL-centric user application (202), then DU circuitry 111 executes the PHY and the HARQ portion of the MAC to process and transfer the UL data to CU circuitry 112 (204). CU circuitry 112 then determines if the UL data is for a DL-centric user application or a UL-centric user application (205). If the UL data is for a DL-centric user application (206), then CU circuitry 112 transfers the UL data to core circuitry 113 (207). If the UL data is for a UL-centric user application (206), then CU circuitry 112 executes the rest of the MAC (not HARQ), RLC, PDCP, and RRC to process and transfer the UL data to core circuitry 113 (208).

In process block 209, CU circuitry 112 receives DL data and determines if the DL data is for a DL-centric user application or a UL-centric user application (209). If the DL data is for a DL-centric user application (210), then CU circuitry 112 executes the RRC, PDCP, RLC, and part of the MAC (no HARQ) to process and transfer the DL data to DU circuitry 111 (211). If the DL data is for a UL-centric user application (210), then CU circuitry 111 transfers the DL data to DU circuitry 111 (212). DU circuitry 111 determines if the DL data is for a DL-centric user application or a UL-centric user application (213). If the DL data is for a DL-centric user application (214), then DU circuitry 111 executes the HARQ portion of the MAC and the PHY to process and transfer the DL data to UE 101 (215). If the DL data is for a UL-centric user application (214), then DU circuitry 111 executes the RRC, PDCP, RLC, MAC, and PHY to process and transfer the DL data to UE 101 (216). Advantageously, DU circuitry 111 and CU circuitry 112 handle the user application with its own optimized network architecture based on UL/DL centricity.

Figure 3:
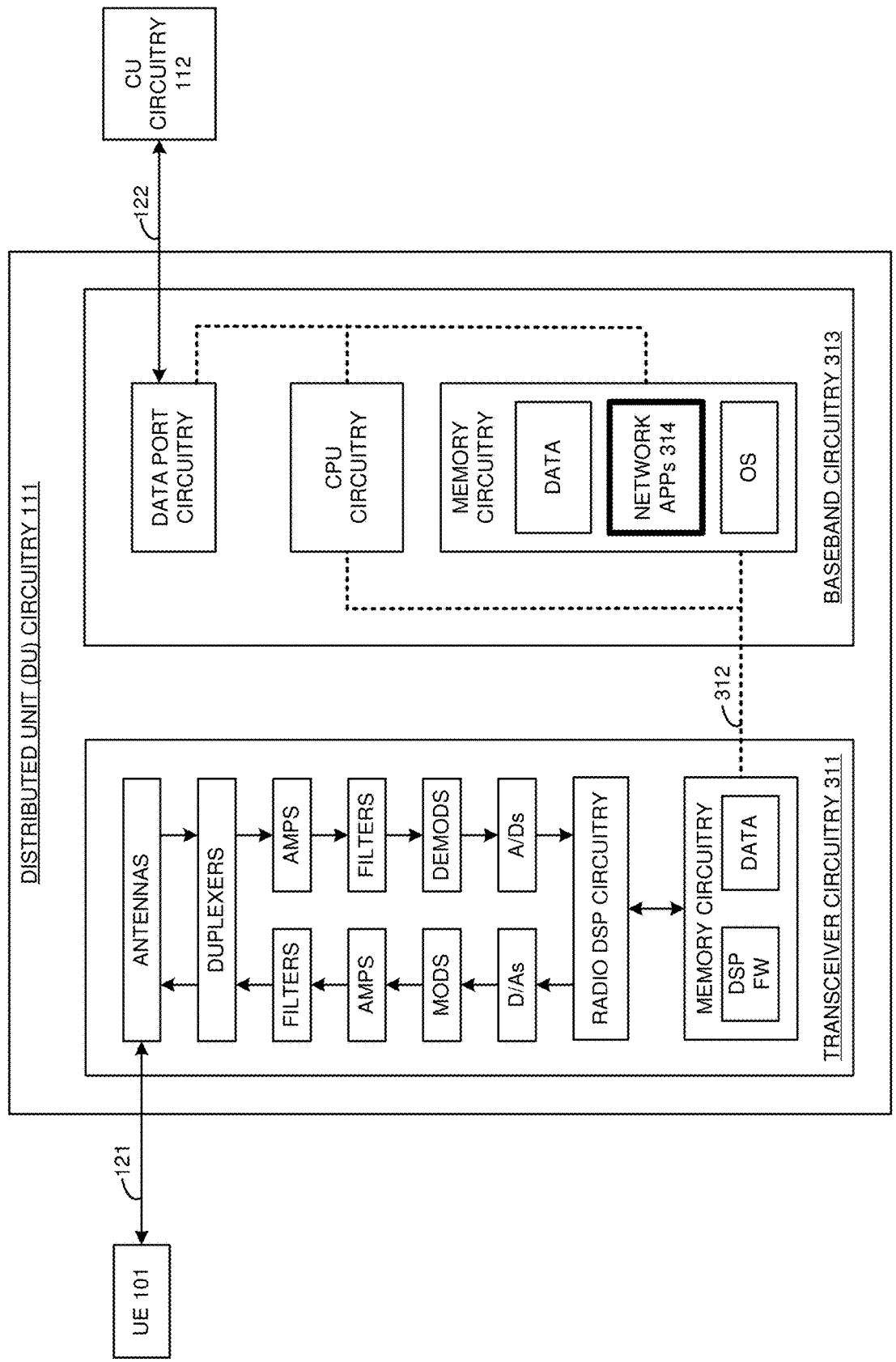
FIG. 3 illustrates Distributed Unit (DU) circuitry that simultaneously processes UL data and DL data for user applications based on whether the user applications are UL-centric or DL-centric.

FIG. 3 illustrates Distributed Unit (DU) circuitry 111 that simultaneously processes UL data and DL data for user applications based on whether the user applications are UL-centric or DL-centric. DU circuitry 111 comprises transceiver circuitry 311 and baseband circuitry 313 that are coupled by data link 312. Transceiver circuitry 311 comprises antennas, duplexers, modulators, filters, amplifiers (AMPS), Analog-to-Digital converters (A/Ds), Digital-to-Analog converters (D/As), radio DSP circuitry, memory, and bus interfaces. The memory stores data and DSP firmware (FW). In transceiver circuitry 311, the radio DSP circuitry executes the DSP FW to drive the wireless exchange of the data with wireless UE 101 over wireless link 121. Data link 312 comprises a bus, Ethernet link, internet link, or some other data coupling—including combinations thereof. Baseband circuitry 313 comprises data port circuitry, CPU circuitry, memory circuitry, and bus interfaces (the bus interfaces are indicated by dashed lines). The memory stores data, operating system software (OS), and network software applications (APPs) 314. The data port circuitry comprises transceivers to support communications over Ethernet, IP, X2, S1-MME, S1-U, and the like. In baseband circuitry 313, the CPU circuitry executes the operating system and network applications 314 to control the exchange of the data between UE 101 and CU circuitry 112.

In transceiver circuitry 311, the antennas receive wireless UL signals over wireless link 121 and transfer corresponding electrical UL signals through the duplexers to the amplifiers. The amplifiers boost the UL signals for the filters which attenuate unwanted energy. Demodulators down-convert the UL signals from their carrier frequencies. A/Ds convert the analog UL signals into digital UL signals for the radio DSP circuitry. The radio DSP circuitry recovers UL data from the UL signals and transfers the recovered UL data to the memory circuitry. The UL data mainly comprises user data but also includes Hybrid Answer Repeat Request (HARQ) Acknowledgements (ACKs) and other signaling. Data link 312 transfers the UL data from the memory circuitry in transceiver circuitry 311 to the memory circuitry in baseband circuitry 313. The CPU circuitry executes the OS to process the UL data through network applications 314. Network applications 314 dynamically adjust the UL data processing path for the UL data (and for the network at large) based on the UL/DL centricity of the user application transferring the UL data. Network applications 314 direct the CPU circuitry to transfer the UL data through the data port circuitry and over data link 122 to CU circuitry 112.

In baseband circuitry 313, the data port circuitry receives DL data from CU circuitry 113 over data link 122. The CPU circuitry executes the OS to process the DL data through network applications 314. Network applications 314 dynamically adjust the DL data processing path and network architecture based on the UL/DL centricity of the user application receiving the DL data. Network applications 314 direct the CPU circuitry to transfer the DL data from the memory circuitry over data link 312 to the memory circuitry in transceiver circuitry 311. The DL data mainly comprises user data but also includes HARQ ACKs and other signaling. In transceiver circuitry 311, the radio DSP circuitry retrieves the DL data and transfers corresponding DL signals to the D/As. The D/As convert the DL signals into analog DL signals for the modulators. The modulators up-convert the DL signals to their carrier frequencies. The amplifiers boost the UL signals for the filters which attenuate unwanted out-of-band energy. The filters transfer the DL signals through the duplexers to the antennas. The electrical DL signals drive the antennas to emit corresponding wireless DL signals to UE 101 over wireless link 121.

Figure 4:
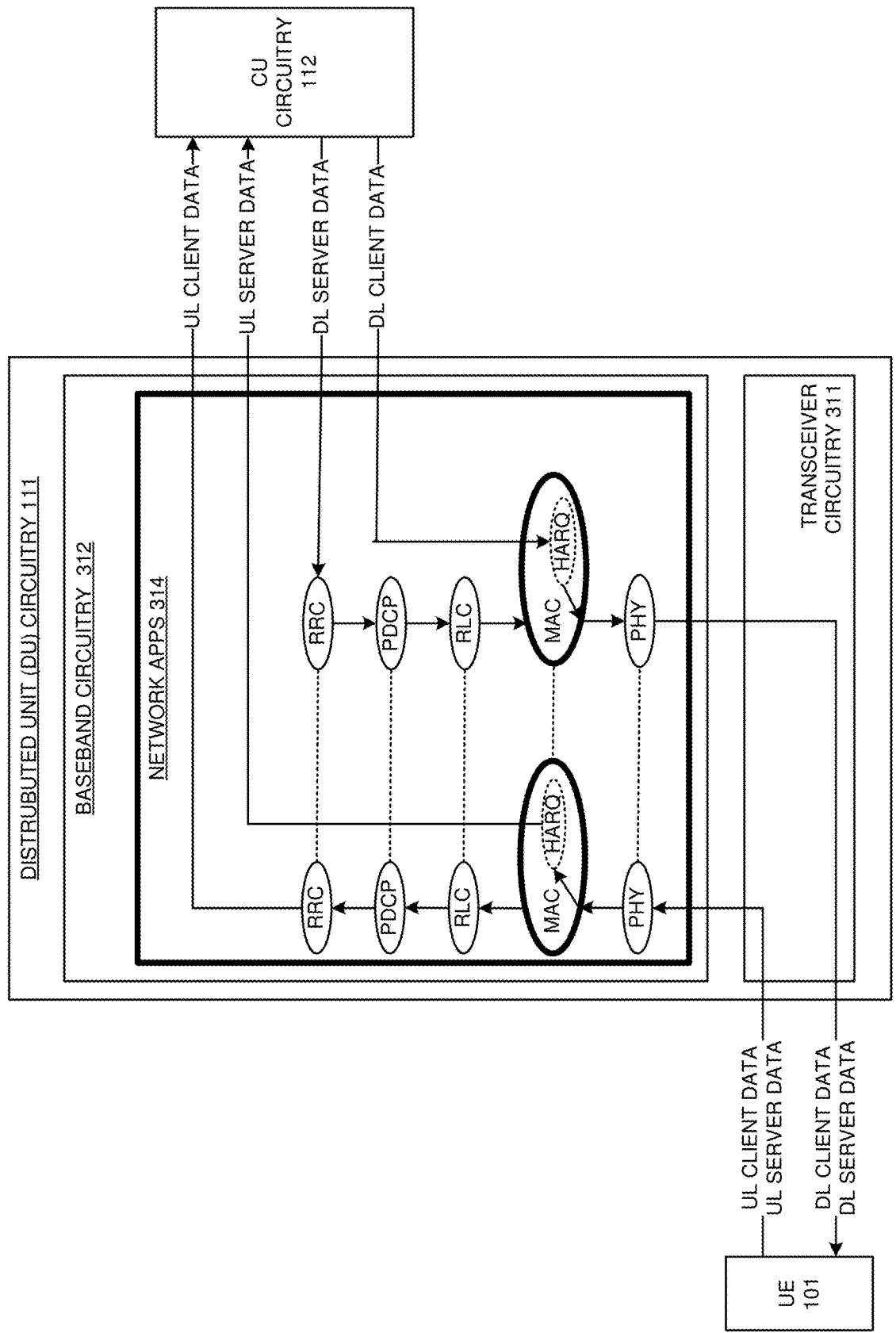
FIG. 4 illustrates the DU circuitry that simultaneously processes UL data and DL data for the user applications based on whether the user applications are UL-centric or DL-centric.

FIG. 4 illustrates another view of DU circuitry 111 with transceiver circuitry 311 and baseband circuitry 313. Network applications 314 are executed by baseband circuitry 312 to process user data as follows. For the UL, the UL PHY processes the UL client data and the UL server data to map between physical channels on wireless link 121 and MAC transport channels for the UL MAC. The UL PHY transfers processing for the UL data to the UL MAC. The UL MAC processes the UL client data and the UL server data to map between the MAC transport channels and MAC logical channels. The UL MAC also processes UL data from UE 101 to identify buffer status, power headroom, channel quality, HARQ acknowledgements, UE identifiers, and the like.

Advantageously, the UL MAC determines if the UL data is for UL-centric user applications or DL-centric user applications in UE 101. The UL/DL centricity is determined by processing packet markers/addressing from the UL data that maps through a MAC data structure to yield the UL-centric or DL-centric designations. For example, the source and destination IP port combination could translate to the UL/DL centricity of associated user application. For the UL data from UL-centric server applications in UE 101, the UL MAC in DU circuitry 111 performs HARQ. To perform HARQ on the UL, the UL MAC transfers ACKs for UL data for delivery to UE 101 through the HARQ portion of the DL MAC. The UL MAC also relays HARQ ACKs from UE 101 for the DL to the HARQ portion of the DL MAC. The UL MAC then transfers processing for the UL server data to the UL MAC in CU circuitry 112.

For the UL client data, the UL MAC performs HARQ, random access, power control, and scheduling. To perform HARQ, the UL MAC transfers ACKs for the UL data from UE 101 for delivery to UE 101 through the HARQ portion of the DL MAC. The UL MAC also relays ACKs from UE 101 for the DL to the HARQ portion of the DL MAC. To perform random access, the UL MAC processes access signaling from UE 101 to identify UE 101 and initiate scheduling for UE 101. To perform power control, the UL MAC processes channel quality and power headroom to adjust UE power (over the DL MAC) to overcome poor channel quality within headroom and interference limits. To perform scheduling, the UL MAC processes radio channel quality, buffer status, and radio interference to assign UL data to wireless payloads that comprise combinations of time-period and frequency-band called resource blocks. The UL MAC signals the UL schedule to UE 101 over the DL. In most cases, the UL MAC processes performance data like data-rate, delay, error-rate, and jitter to maintain UL Quality-of-Service (QoS) on wireless link 121. The UL MAC transfers processing for the UL client data to the UL RLC.

For the UL client data, the UL RLC maps between the MAC logical channels and Protocol Data Units (PDUs) or Radio Bearers (RBs). The UL RLC performs ARQ for the UL client data by transferring UL ACKs to the DL RLC for delivery to UE 101. The UL RLC also relays ARQ ACKs for the DL data between UE 101 and the DL RLC. The UL RLC transfers processing for the UL client data to the UL PDCP. For the UL client data, the UL PDCP maps between the PDUs from the UL RLC and Service Data Units (SDUs) for the UL RRC. The UL PDCP handles security by applying ciphering. The UL PDCP performs header decompression for the UL client data from UE 101. The PDCP orders the SDUs in their proper sequence and eliminates duplicate UL client data. The UL PDCP transfers processing for the UL client data to the UL RRC. For the UL client data, the UL RRC establishes UL RRC connections for UE 101. The UL RRC transfers the UL client data to a router (RTR) in CU circuitry 112. The UL RRC also supports Non-Access Stratum (NAS) messaging between UE 101 and core circuitry 113.

The DL RRC receives the DL server data from a router in CU circuitry 112. For the DL server data, the DL RRC transfers system information to UE 101. The DL RRC supports NAS messaging between UE 101 and core circuitry 113. The DL RRC establishes DL RRC connections for UE 101. The DL RRC handles paging for UE 101. The DL RRC transfers processing for the DL client data to the DL PDCP. For the DL server data, the DL PDCP maps between the SDUs from the DL RRC and the PDUs for the DL RLC. The DL PDCP handles security by applying ciphering. The DL PDCP performs header compression for the DL server data. The PDCP orders the PDUs in their proper sequence and eliminates duplicate DL data. The DL PDCP transfers processing for the DL server data to the DL RLC. For the DL server data, the DL RLC sizes PDU and maps between the PDUs and MAC logical channels. The DL RLC performs ARQ for the DL server data by relaying ACKs for the UL and by retransmitting DL data that was not properly received by UE 101. The DL RLC transfers processing for the DL server data to the DL MAC.

The DL MAC processes the DL server data to map between the MAC logical channels and MAC transport channels. For the DL server data, the DL MAC performs scheduling, power control, random access, and HARQ. To perform scheduling, the DL MAC processes radio channel quality, buffer status, and radio interference to assign DL server data to wireless resource blocks. In most cases, the DL MAC processes performance data like data-rate, delay, error-rate, and jitter to maintain DL QoS on wireless link 121. To perform power control, the DL MAC relays power control signaling from the UL MAC to UE 101. To perform random access, the DL MAC relays access signaling between the UL MAC and UE 101 to identify and initiate scheduling for UE 101. To perform HARQ, the DL MAC relays ACKs for the UL data from the UL MAC to UE 101. The DL MAC also retransmits DL server data that was not properly received by UE 101. The DL MAC transfers processing for the DL server data to the DL PHY.

In the DL MAC, the HARQ portion receives the DL client data from the DL MAC in CU circuitry 112. The DL MAC in DU circuitry 111 performs HARQ for the DL client data. To perform HARQ, the DL MAC relays ACKs for the UL client data and re-transmits glitchy DL client data. The DL MAC then transfers processing for the DL client data to the DL PHY. For the DL, the PHY processes the DL client data and the DL server data to map between the MAC transport channels from the DL MAC and the physical DL channels on wireless link 121. The DL PHY transfers processing for the DL data to the OS.

For UL server data and the DL client data, DU circuitry 111 handles less processing than CU circuitry 112 given the large amount of UL server data for the UL-centric application and the large amount of UL server data for the UL-centric application. CU circuitry 112 more efficiently handles the heavy UL server data load and the heavy DL client data load. The processing resources in DU circuitry 111 are conserved. For UL client data and the DL server data, DU circuitry 111 handles the processing instead of CU circuitry 112 given the small amount of UL client data for the DL-centric user application and the small amount of DL server data for the UL-centric server application. DU circuitry 112 can efficiently handle the light UL client data load and the light DL server data load.

Figure 5:
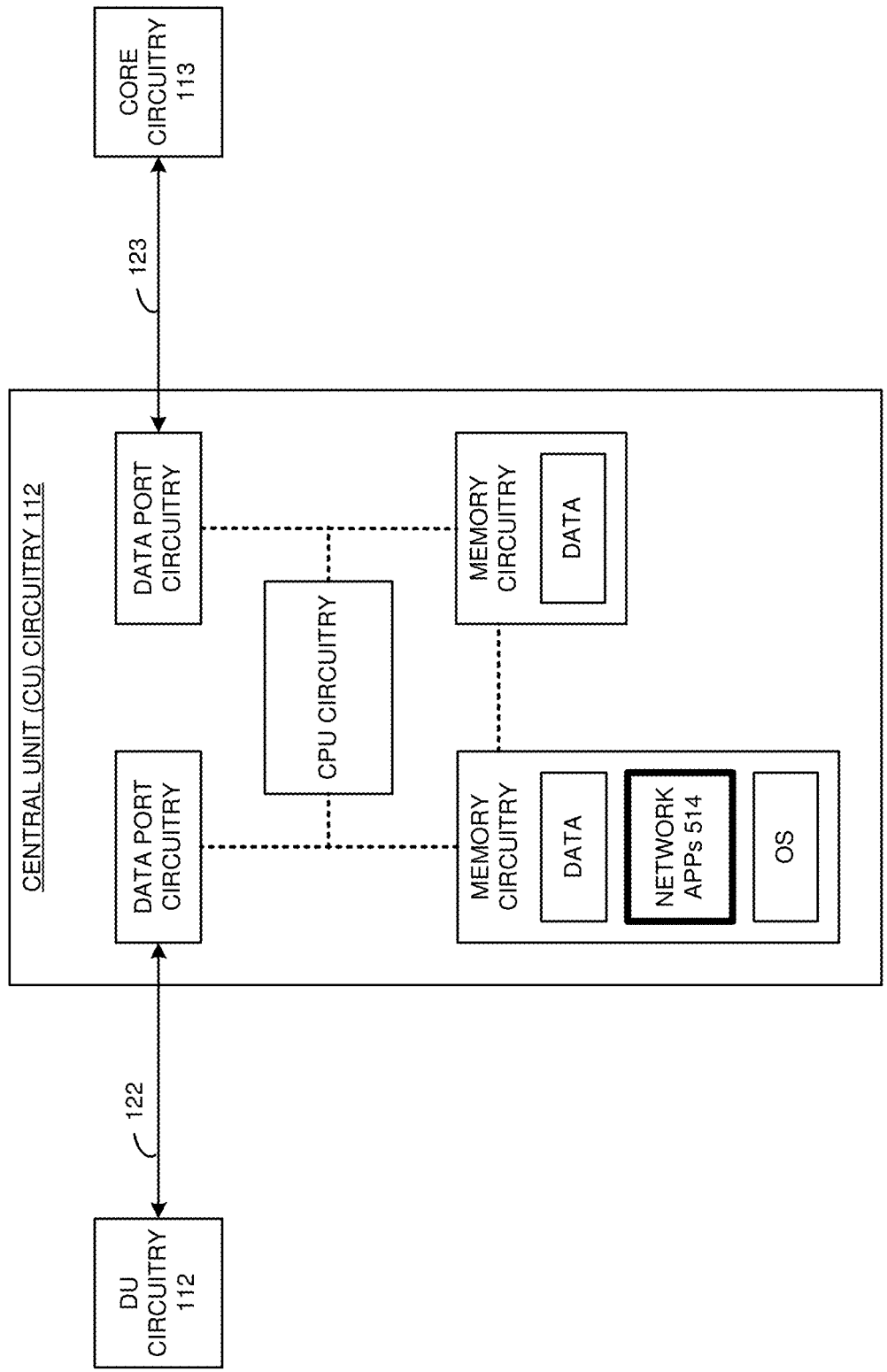
FIG. 5 illustrates Central Unit (CU) circuitry that simultaneously processes UL data and DL data for user applications based on whether the user applications are UL-centric or DL-centric.

FIG. 5 illustrates Central Unit (CU) circuitry 112 that simultaneously processes UL data and DL data for user applications based on whether the user applications are UL-centric or DL-centric. CU circuitry 112 comprises data port circuitry, CPU circuitry, memory circuitry, and bus interfaces (dashed lines). The memory stores data, operating system, and network applications 514. The data port circuitry comprises transceivers to support Ethernet, IP, X2, S1-MME, S1-U, and the like. In CU circuitry 112, the CPU circuitry executes the operating system and network applications 514 to control the exchange of the data between DU circuitry 112 and core circuitry 113.

The data port circuitry receives UL signals over data link 122 from DU circuitry 112 and loads the UL data into the memory circuitry. The CPU circuitry executes the operating system to process the UL data through network applications 514. Network applications 514 dynamically adjust the UL data processing path and network architecture based on the UL/DL centricity of the user application transferring the UL data. Network applications 514 direct the CPU circuitry to transfer the UL data from the memory circuitry to the data port circuitry for transfer over data link 122 to core circuitry 113.

The data port circuitry also receives DL signals over data link 123 from core circuitry 113 and loads the DL data into the memory circuitry. The CPU circuitry executes the operating system to process the DL data through network applications 514. Network applications 514 dynamically adjust the DL data processing path and network architecture based on the UL/DL centricity of the user application receiving the DL data. Network applications 514 direct the CPU circuitry to transfer the DL data from the memory circuitry to the data port circuitry for transfer over data link 122 to DU circuitry 113.

Figure 6:
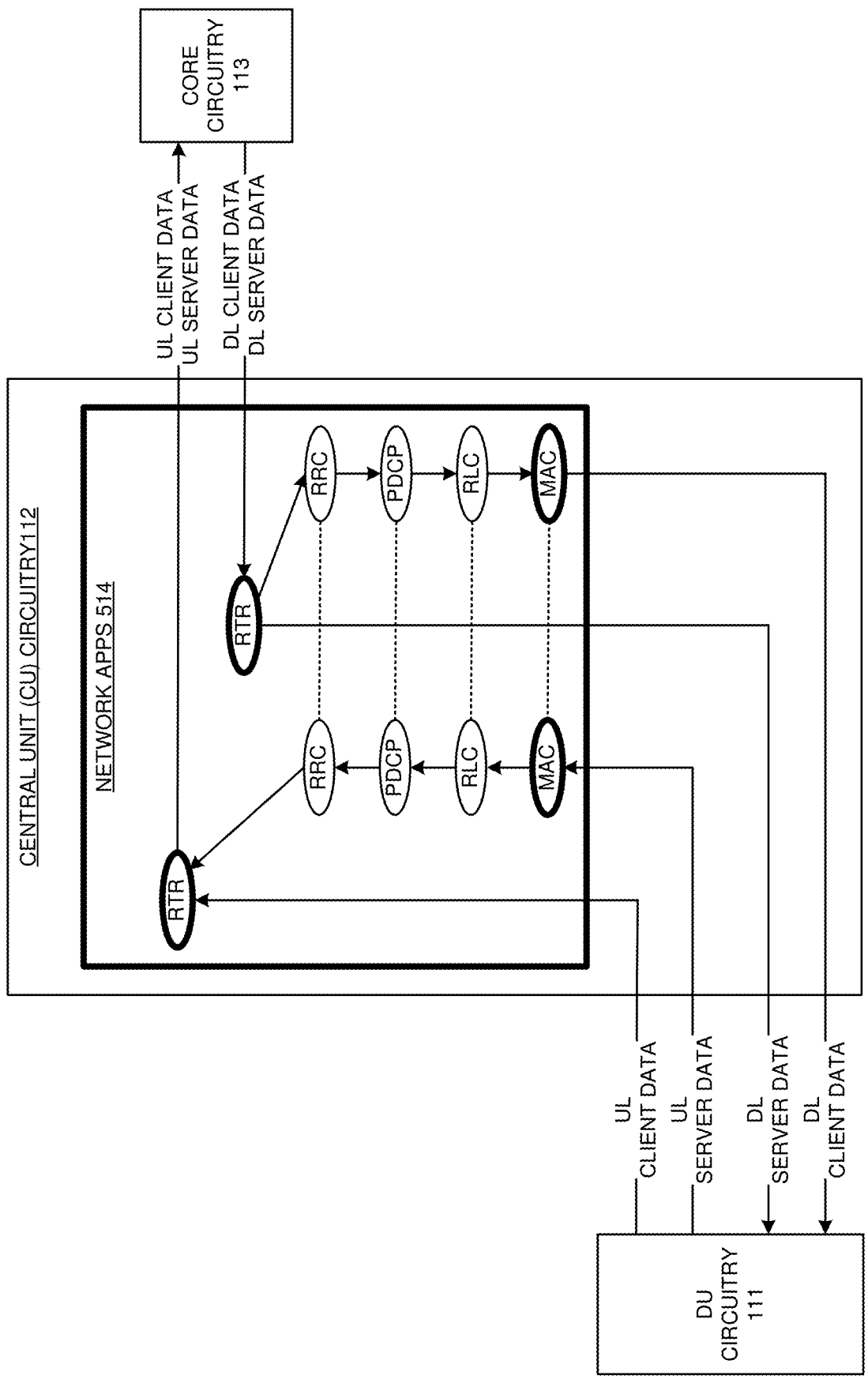
FIG. 6 illustrates the CU circuitry that simultaneously processes UL data and DL data for user applications based on whether the user applications are UL-centric or DL-centric.

FIG. 6 illustrates another view of CU circuitry 112 that processes the UL data and DL data for user applications based on whether the user applications are UL-centric or DL-centric. Network applications 514 are executed by CU circuitry 112 to process user data as follows. For the UL client data, the UL router (RTR) transfers the UL client data from DU circuitry 111 to core circuitry 113. For the UL server data, the UL MAC performs random access, power control, and scheduling, but not HARQ since the UL MAC in DU circuitry 111 performs HARQ. The UL MAC also processes the UL server data to identify buffer status, power headroom, channel quality, UE identifiers, and the like. To perform random access for the UL server data, the UL MAC processes access signaling from UE 101 to identify UE 101 and initiate scheduling for UE 101. To perform power control, the UL MAC processes channel quality and power headroom to adjust UE power (using the DL) to overcome poor channel quality within headroom and interference limits. To perform scheduling, the UL MAC processes radio channel quality, buffer status, and radio interference to assign UL server data to wireless resource blocks. The UL MAC signals the UL schedule to UE 101 over the DL MAC. In most cases, the UL MAC processes performance data like data-rate, delay, error-rate, and jitter to maintain UL QoS on wireless link 121. The UL MAC transfers processing for the UL server data to the UL RLC.

For the UL server data, the UL RLC maps between the MAC logical channels and Protocol Data Units (PDUs) or Radio Bearers (RBs). The UL RLC performs ARQ for the UL server data by transferring ACKs to the DL RLC circuitry for delivery to UE 101. The UL RLC also relays ARQ ACKs for the DL data between UE 101 and the DL RLC. The UL RLC transfers processing for the UL server data to the UL PDCP. For the UL server data, the UL PDCP maps between the PDUs from the UL RLC and Service Data Units (SDUs) for the UL RRC. The UL PDCP handles security by applying ciphering. The UL PDCP performs header decompression for the UL server data from UE 101. The PDCP orders the SDUs in their proper sequence and eliminates duplicate UL server data. The UL PDCP transfers processing for the UL server data to the UL RRC. For the UL server data, the UL RRC establishes UL RRC connections for UE 101 by signaling over the DL. The UL RRC transfers the UL server data to the UL router for transfer to core circuitry 113. The UL RRC also supports NAS messaging between UE 101 and core circuitry 113.

The DL router receives DL client data and DL server data from core circuitry 113 for delivery to UE 101. Advantageously, the DL router determines if the DL data is for UL-centric user applications or DL-centric user applications in UE 101. The UL/DL centricity is determined by packet markers or addressing from the DL data that maps through a router data structure to yield UL-centric or DL-centric designations. The DL router transfers the DL server data to the DL RRC in DU circuitry 111.

The DL router transfers the DL client data to the DL RRC in CU circuitry 112. For the DL client data, the DL RRC transfers system information to UE 101. The DL RRC supports NAS messaging between UE 101 and core circuitry 113. The DL RRC establishes DL RRC connections for UE 101. The DL RRC handles paging for UE 101. The DL RRC transfers processing for the DL client data to the DL PDCP. For the DL client data, the DL PDCP maps between the SDUs from the DL RRC and the PDUs for the DL RLC. The DL PDCP handles security by applying ciphering. The DL PDCP performs header compression for the DL server data. The PDCP orders the PDUs in their proper sequence and eliminates duplicate DL data. The DL PDCP transfers processing for the DL client data to the DL RLC. For the DL client data, the DL RLC sizes PDUs and maps between the PDUs and MAC logical channels. The DL RLC performs ARQ for the DL server data by relaying ACKs for the UL and by retransmitting DL data that was not properly received by UE 101. The DL RLC transfers processing for the DL client data to the DL MAC.

The DL MAC processes the DL client data to map between the MAC logical channels and MAC transport channels. For the DL client data, the DL MAC performs scheduling, power control, and random access. The DL MAC in CU circuitry 112 does not perform HARQ. To perform scheduling, the DL MAC processes radio channel quality, buffer status, and radio interference to assign DL server data to wireless resource blocks. The DL MAC signals its DL schedule and the UL schedule from the UL MAC to UE 101 over the DL. In most cases, the DL MAC processes performance data like data-rate, delay, error-rate, and jitter to maintain DL QoS on wireless link 121. To perform power control, the DL MAC relays power control signaling from the UL MAC to UE 101. To perform random access, the DL MAC relays random access signaling between the UL MAC and UE 101 to identify and initiate scheduling for UE 101. The DL MAC transfers processing for the DL client data to the HARQ portion of the DL MAC in DU circuitry.

For UL server data and the DL client data, CU circuitry 111 handles more processing than DU circuitry 111 given the large amount of UL server data for the UL-centric application and the large amount of UL server data for the UL-centric application. CU circuitry 112 more efficiently handles the heavy UL server data load and the heavy DL client data load. The processing resources in DU circuitry 111 are conserved. For the UL client data and the DL server data, DU circuitry 111 handles the processing instead of CU circuitry 112 given the small amount of UL client data for the DL-centric user application and the small amount of DL server data for the UL-centric server application. DU circuitry 112 can efficiently handle the light UL client data load and the light DL server data load.

Figure 7:
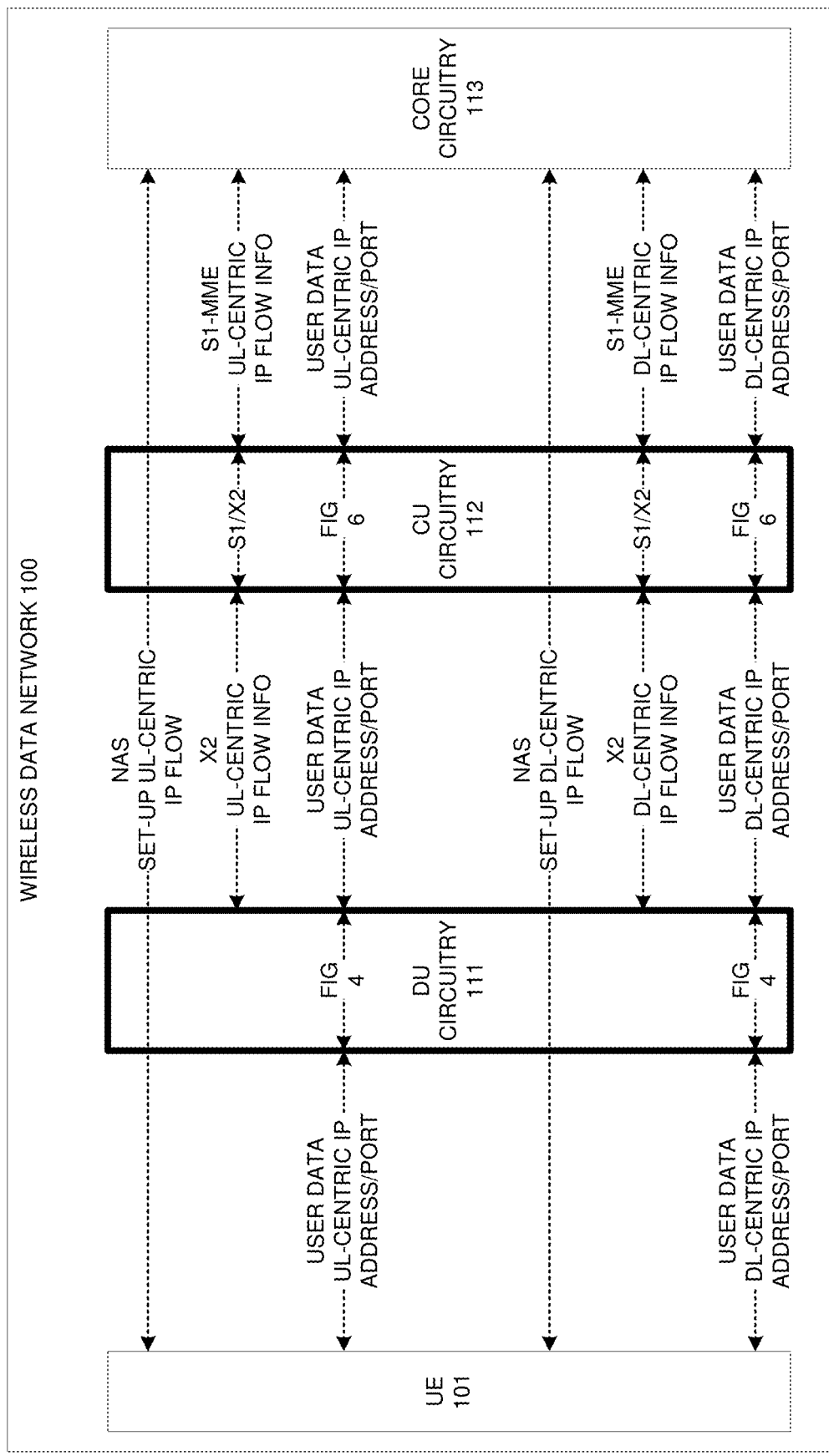
FIG. 7 illustrates the wireless data network to process UL data and DL data for user applications based on whether the user applications are UL-centric or DL-centric.

FIG. 7 illustrates wireless data network 100 that processes the UL data and DL data for a user application based on whether the user application is UL-centric or DL-centric. Initially, UE 101 and core circuitry 113 exchange Non-Access Stratum (NAS) signaling over DU circuitry 111 and CU circuitry 112 to establish an IP flow for an UL-centric server application. Prior to IP flow establishment, all UE traffic may process all UE traffic as DL centric or may use another default network architecture. Core circuitry 113 transfers S1-MME signaling to CU circuitry 112 that indicates addresses, ports, and other data for the UL-centric IP flow. CU circuitry 112 transfers X2 (or S1-MME) signaling to DU circuitry that indicates addresses, ports, and other data for the UL-centric IP flow. UE 101 and DU circuitry 111 wirelessly exchange UL/DL data for the UL-centric IP flow. In response to the signaling, DU circuitry 111 applies the processing of FIG. 4 for UL-centric data. DU circuitry 111 and CU circuitry 112 exchange UL/DL data for the UL-centric IP flow. In response to the signaling, CU circuitry 112 applies the processing of FIG. 6 for UL-centric data. CU circuitry 112 and core circuitry 113 exchange UL/DL data for the UL-centric IP flow.

Contemporaneously, UE 101 and core circuitry 113 exchange Non-Access Stratum (NAS) signaling over DU circuitry 111 and CU circuitry 112 to establish another IP flow for a DL-centric client application. Core circuitry 113 transfers S1-MME signaling to CU circuitry 112 that indicates the addresses, ports, and other data for the DL-centric IP flow. CU circuitry 112 transfers X2 (or S1-MME) signaling to DU circuitry 111 that indicates the addresses, ports, and other data for the DL-centric IP flow. UE 101 and DU circuitry 111 wirelessly exchange UL/DL data for the DL-centric IP flow. In response to the signaling, DU circuitry 111 applies the processing of FIG. 4 for DL-centric data. DU circuitry 111 and CU circuitry 112 exchange UL/DL data for the DL-centric IP flow. In response to the signaling, CU circuitry 112 applies the processing of FIG. 6 for DL-centric data. CU circuitry 112 and core circuitry 113 exchange UL/DL data for the DL-centric IP flow.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method to process uplink-centric user data for an uplink-centric user application and to process downlink-centric user data for a downlink-centric user application, the method comprising:
   - a Distributed Unit (DU) receiving the uplink-centric user data for the uplink-centric user application executed by a user device;
   - the DU receiving the downlink-centric user data for the downlink-centric user application executed by the user device;
   - the DU processing the uplink-centric user data with uplink-centric network applications based on the uplink-centric user application; and
   - the DU processing the downlink-centric user data with downlink-centric network applications based on the downlink-centric user application;
   - wherein the uplink-centric network applications comprise an uplink Physical Layer (PHY), uplink Media Access Control (MAC), Hybrid Automatic Repeat Request (HARQ) in the uplink MAC, uplink Radio Link Control (RLC), uplink Packet Data Convergence Protocol (PDCP), and uplink Radio Resource Control (RRC); and
   - wherein the downlink-centric network applications comprise a downlink PHY, downlink MAC, downlink RLC, downlink PDCP, and downlink RRC and the downlink MAC does not comprise the HARQ.

2. The method of claim 1 wherein:
the DU receiving the uplink-centric user data for the uplink-centric user application comprises receiving the uplink-centric user data having a first Internet Protocol (IP) address;
the DU receiving the downlink-centric user data for the downlink-centric user application comprises receiving the downlink-centric user data having a second IP address;
the DU processing the uplink-centric user data with the uplink-centric network applications based on the uplink-centric user application comprises processing the uplink-centric user data with the uplink-centric network applications based on the first IP address; and
the DU processing the downlink-centric user data with the downlink-centric network applications based on the downlink-centric user application comprises processing the downlink-centric user data with the downlink-centric network applications based on the second IP address.

3. The method of claim 1 wherein:
the DU receiving the uplink-centric user data for the uplink-centric user application comprises receiving the uplink-centric user data having a first Internet Protocol (IP) port;
the DU receiving the downlink-centric user data for the downlink-centric user application comprises receiving the downlink-centric user data having a second IP port;
the DU processing the uplink-centric user data with the uplink-centric network applications based on the uplink-centric user application comprises processing the uplink-centric user data with the uplink-centric network applications based on the first IP port; and
the DU processing the downlink-centric user data with the downlink-centric network applications based on the downlink-centric user application comprises processing the downlink-centric user data with the downlink-centric network applications based on the second IP port.

4. The method of claim 1 wherein:
the DU receiving the uplink-centric user data for the uplink-centric user application comprises receiving the uplink-centric user data having a first packet mark;
the DU receiving the downlink-centric user data for the downlink-centric user application comprises receiving the downlink-centric user data having a second packet mark;
the DU processing the uplink-centric user data with the uplink-centric network applications based on the uplink-centric user application comprises processing the uplink-centric user data with the uplink-centric network applications based on the first packet mark; and
the DU processing the downlink-centric user data with the downlink-centric network applications based on the downlink-centric user application comprises processing the downlink-centric user data with the downlink-centric network applications based on the second packet mark.

5. The method of claim 1 further comprising:
the DU receiving first Non-Access Stratum (NAS) signaling from the user device that requests an uplink-centric Internet Protocol (IP) flow for the uplink-centric user application;
the DU processing the first NAS signaling with the downlink-centric network applications to deliver the first NAS signaling to core network circuitry via a Centralized Unit (CU);
the DU receiving first signaling from the CU that directs the DU to process the uplink-centric user data with the uplink-centric network applications;
the DU receiving second NAS signaling from the user device that requests a downlink-centric IP flow for the downlink-centric user application;
the DU processing the second NAS signaling with the downlink-centric network applications to deliver the second NAS signaling to the core network circuitry via the CU; and
the DU receiving second signaling from the CU that directs the DU to process the downlink-centric user data with the downlink-centric network applications; and wherein:
the DU processing the uplink-centric user data with the uplink-centric network applications based on the uplink-centric user application comprises the DU processing the uplink-centric user data with the uplink-centric network applications based on the first signaling; and
the DU processing the downlink-centric user data with the downlink-centric network applications based on the downlink-centric user application comprises the DU processing the downlink-centric user data with the downlink-centric network applications based on the second signaling.

6. The method of claim 1 further comprising:
the DU utilizing the uplink MAC to determine that the uplink-centric user data is for the uplink-centric user application based on one or more of a first packet marker in the uplink-centric user data, a first Internet Protocol (IP) address associated with the uplink-centric user data, or a first IP port associated with the uplink-centric user data; and
the DU utilizing the uplink MAC to determine that the downlink-centric user data is for the downlink-centric user application based on one or more of a second packet marker in the downlink-centric user data, a second IP address associated with the downlink-centric user data, or a second IP port associated with the downlink-centric user data.

7. The method of claim 6 wherein:
the DU processing the uplink-centric user data with the uplink-centric network applications based on the uplink-centric user application comprises the DU processing the uplink-centric user data with the uplink-centric network applications based on an uplink determination by the uplink MAC; and
the DU processing the downlink-centric user data with the downlink-centric network applications based on the downlink-centric user application comprises the DU processing the downlink-centric user data with the downlink-centric network applications based on a downlink determination by the uplink MAC.

8. A method to process uplink-centric user data for an uplink-centric user application and to process downlink-centric user data for a downlink-centric user application, the method comprising:
a Centralized Unit (CU) receiving the uplink-centric user data for the uplink-centric user application executed by a user device;

the CU receiving the downlink-centric user data for the downlink-centric user application executed by the user device;
the CU processing the uplink-centric user data with uplink-centric network applications based on the uplink-centric user application; and
the CU processing the downlink-centric user data with downlink-centric network applications based on the downlink-centric user application;
wherein the uplink-centric network applications comprise an uplink Physical Layer (PHY), uplink Media Access Control (MAC), Hybrid Automatic Repeat Request (HARQ) in the uplink MAC, uplink Radio Link Control (RLC), uplink Packet Data Convergence Protocol (PDCP), and uplink Radio Resource Control (RRC); and
wherein the downlink-centric network applications comprise a downlink PHY, downlink MAC, downlink RLC, downlink PDCP, and downlink RRC and the downlink MAC does not comprise the HARQ.

9. The method of claim 8 wherein:
the CU receiving the uplink-centric user data for the uplink-centric user application comprises receiving the uplink-centric user data having a first Internet Protocol (IP) address;
the CU receiving the downlink-centric user data for the downlink-centric user application comprises receiving the downlink-centric user data having a second IP address;
the CU processing the uplink-centric user data with the uplink-centric network applications based on the uplink-centric user application comprises processing the uplink-centric user data with the uplink-centric network applications based on the first IP address; and
the CU processing the downlink-centric user data with the downlink-centric network applications based on the downlink-centric user application comprises processing the downlink-centric user data with the downlink-centric network applications based on the second IP address.

10. The method of claim 8 wherein:
the CU receiving the uplink-centric user data for the uplink-centric user application comprises receiving the uplink-centric user data having a first Internet Protocol (IP) port;
the CU receiving the downlink-centric user data for the downlink-centric user application comprises receiving the downlink-centric user data having a second IP port;
the CU processing the uplink-centric user data with the uplink-centric network applications based on the uplink-centric user application comprises processing the uplink-centric user data with the uplink-centric network applications based on the first IP port; and
the CU processing the downlink-centric user data with the downlink-centric network applications based on the downlink-centric user application comprises processing the downlink-centric user data with the downlink-centric network applications based on the second IP port.

11. The method of claim 8 wherein:
the CU receiving the uplink-centric user data for the uplink-centric user application comprises receiving the uplink-centric user data having a first packet mark;
the CU receiving the downlink-centric user data for the downlink-centric user application comprises receiving the downlink-centric user data having a second packet mark;
the CU processing the uplink-centric user data with the uplink-centric network applications based on the uplink-centric user application comprises processing the uplink-centric user data with the uplink-centric network applications based on the first packet mark; and
the CU processing the downlink-centric user data with the downlink-centric network applications based on the downlink-centric user application comprises processing the downlink-centric user data with the downlink-centric network applications based on the second packet mark.

12. The method of claim 8 further comprising:
the CU receiving first Non-Access Stratum (NAS) signaling from the user device that requests an uplink-centric Internet Protocol (IP) flow for the uplink-centric user application;
the CU processing the first NAS signaling with the downlink-centric network applications to deliver the first NAS signaling to core network circuitry;
the CU receiving first signaling from the core network circuitry that directs the CU to process the uplink-centric user data with the uplink-centric network applications;
the CU receiving second NAS signaling from the user device that requests a downlink-centric IP flow for the downlink-centric user application;
the CU processing the second NAS signaling with the downlink-centric network applications to deliver the second NAS signaling to the core network circuitry; and
the CU receiving second signaling from the core network circuitry that directs the CU to process the downlink-centric user data with the downlink-centric network applications; and
wherein:
the CU processing the uplink-centric user data with the uplink-centric network applications based on the uplink-centric user application comprises the CU processing the uplink-centric user data with the uplink-centric network applications based on the first signaling; and
the CU processing the downlink-centric user data with the downlink-centric network applications based on the downlink-centric user application comprises the CU processing the downlink-centric user data with the downlink-centric network applications based on the second signaling.

13. The method of claim 8 further comprising:
the CU utilizing a router to determine that the uplink-centric user data is for the uplink-centric user application; and
the CU utilizing the router to determine that the downlink-centric user data is for the downlink-centric user application.

14. The method of claim 13 further comprising:
the CU processing the uplink-centric user data with the uplink-centric network applications based on the uplink-centric user application comprises processing the uplink-centric user data with the uplink-centric network applications based on an uplink determination by the router; and
the CU processing the downlink-centric user data with the downlink-centric network applications based on the downlink-centric user application comprises processing the downlink-centric user data with the downlink-centric network applications based on a downlink determination by the router.

15. A method to process uplink-centric user data for uplink-centric user applications and to process downlink-centric user data for downlink-centric user applications, the method comprising:
a Distributed Unit (DU) and a Centralized Unit (CU) receiving the uplink-centric user data for the uplink-centric user applications;
the DU and the CU receiving the downlink-centric user data for the downlink-centric user applications;
the DU and the CU processing the uplink-centric user data with uplink-centric network applications distributed across the DU and the CU based on the uplink-centric user applications;
the DU and the CU processing the downlink-centric user data with downlink-centric network applications distributed across the DU and the CU based on the downlink-centric user applications;
wherein the uplink-centric network applications comprise an uplink Physical Layer (PHY), uplink Media Access Control (MAC), Hybrid Automatic Repeat Request (HARQ) in the uplink MAC, uplink Radio Link Control (RLC), uplink Packet Data Convergence Protocol (PDCP), and uplink Radio Resource Control (RRC); and
wherein the downlink-centric network applications comprise a downlink PHY, downlink MAC, downlink RLC, downlink PDCP, and downlink RRC and the downlink MAC does not comprise the HARQ.

16. The method of claim 15 wherein:
the DU and the CU receiving the uplink-centric user data for the uplink-centric user applications comprises receiving the uplink-centric user data having first Internet Protocol (IP) addresses;
the DU and the CU receiving the downlink-centric user data for the downlink-centric user applications comprises receiving the downlink-centric user data having second IP addresses;
the DU and the CU processing the uplink-centric user data with the uplink-centric network applications distributed across the DU and the CU based on the uplink-centric user applications comprises processing the uplink-centric user data with the uplink-centric network applications distributed across the DU and the CU based on the first IP addresses; and
the DU and the CU processing the downlink-centric user data with the downlink-centric network applications distributed across the DU and the CU based on the downlink-centric user applications comprises processing the downlink-centric user data with the downlink-centric network applications distributed across the DU and the CU based on the second IP addresses.

17. The method of claim 15 wherein:
the DU and the CU receiving the uplink-centric user data for the uplink-centric user applications comprises receiving the uplink-centric user data having first Internet Protocol (IP) ports;
the DU and the CU receiving the downlink-centric user data for the downlink-centric user applications comprises receiving the downlink-centric user data having second IP ports;
the DU and the CU processing the uplink-centric user data with the uplink-centric network applications distributed across the DU and the CU based on the uplink-centric user applications comprises processing the uplink-centric user data with the uplink-centric network applications distributed across the DU and the CU based on the first IP ports; and
the DU and the CU processing the downlink-centric user data with the downlink-centric network applications distributed across the DU and the CU based on the downlink-centric user applications comprises processing the downlink-centric user data with the downlink-centric network applications distributed across the DU and the CU based on the second IP ports.

18. The method of claim 15 wherein:
the DU and the CU receiving the uplink-centric user data for the uplink-centric user applications comprises receiving the uplink-centric user data having first packet marks;
the DU and the CU receiving the downlink-centric user data for the downlink-centric user applications comprises receiving the downlink-centric user data having second packet marks;
the DU and CU processing the uplink-centric user data with the uplink-centric network applications distributed across the DU and the CU based on the uplink-centric user applications comprises processing the uplink-centric user data with the uplink-centric network applications distributed across the DU and the CU based on the first packet marks; and
the DU and CU processing the downlink-centric user data with the downlink-centric network applications distributed across the DU and the CU based on the downlink-centric user applications comprises processing the second downlink-centric user data with the downlink-centric network applications distributed across the DU and the CU based on the second packet marks.

19. The method of claim 15 further comprising:
the DU utilizing the uplink MAC to determine that the uplink-centric user data is for the uplink-centric user applications based on one or more of a packet marker in the uplink-centric user data, an Internet Protocol (IP) address associated with the uplink-centric user data, or an IP port associated with the uplink-centric user data; and
the CU utilizing a router to determine the downlink-centric user data is for the downlink-centric user applications.

20. The method of claim 19 wherein:
the DU and CU processing the uplink-centric user data with the uplink-centric network applications distributed across the DU and the CU based on the uplink-centric user applications comprises processing the uplink-centric user data with the uplink-centric network applications distributed across the DU and the CU based on an uplink determination by the uplink MAC; and
the DU and CU processing the downlink-centric user data with the downlink-centric network applications distributed across the DU and the CU based on the downlink-centric user applications comprises processing the downlink-centric user data with the downlink-centric network applications distributed across the DU and the CU based on a downlink determination by the router.

* * * * *